Patented Feb. 28, 1950

2,499,008

UNITED STATES PATENT OFFICE 2,499,008

WAX EXTRACTION

Oscar J. Swenson, Ithaca, N. Y., assignor to The Cuban-American Sugar Company, New York, N. Y., a corporation of New Jersey, and S. C. Johnson & Son, Inc., Racine, Wis., a corporation of Wisconsin No Drawing. Application May 29, 1947, Serial No. 751,443

8 Claims. (Cl. 260—412.5)

This invention relates to a method of extracting wax. More particularly it relates to extraction of wax from sugar mill filter press cake, more generally known as cachaza.

Cane wax is present on the outer surface of the stalk in all varieties of sugar cane. Various methods for obtaining this wax have been proposed, as by scraping the stalk with a sharp instrument, and by passing the stalks through a bath of water heated sufficiently to melt the wax prior to pressing. Rosales suggested drying the cachaza as dry as possible before extracting the wax. None of these proposals have proven to be practical.

Recently, Rhodes and Swenson in Cuban Patent No. 12,500 disclosed a method of extracting wax in which cachaza containing about 60 to 85% of water was treated with a water-immiscible organic solvent for the wax. The wax-laden solvent was then separated from the treated cachaza, and the wax was recovered from the separated solvent. The patentees warn against use of cachaza containing more than 85% water, as it will emulsify with the solvent. They teach a preferred range of 77% water content in the cachaza before treatment with the water-immiscible solvent.

Early in the nineteenth century, Howard introduced the use of a filter press as a means of filtering the scums and juice tank bottoms, or muds as they are more commonly known. Briefly, the filter press consists of a number of iron plates and frames or recessed plates over which filtering clothes are placed. The frames and plates are supported on a heavy frame-work and are clamped together by a powerful jack screw. The cloth itself makes the joints between the frames and plates. There are two general types of presses, the center-feed with recessed plates, and side-feed plate-and-frame presses. The plate-and-frame type of press is generally used in raw sugar factories because of the greater space for the cake, while center-feed presses are in use in many refineries.

There has recently been introduced a rotary vacuum type of filter for the mud waters. The filter consists of a rotating drum, covered with perforated copper plate, which dips into a bath containing the material to be filtered. As the drum rotates, suction is applied to the different segments and a thin cake is formed on the filtering surface. The cake so formed passes under washing sprays and is then dried by suction, and the cake is removed by scrapers.

It has been found that the addition of a filter aid, such as bagacillo (fine bagasse) to the feed mixer from which the mixture is fed to the filter results in the formation of a more solid and more porous cachaza on the filtering surface of the rotary vacuum filter, and aids generally in obtaining a more efficient filtration of the muds.

The amount of water present in the solid cachaza which is scraped from the rotary vacuum filter will vary according to the speed of rotation of the drum, the amount of bagacillo present in the cachaza, and constitution of the mud, but in good commercial practice is around 80%. While wax may be extracted very efficiently by the Rhodes-Swenson method from cachaza which has been obtained from the plate-and-frame press, the extraction efficiency obtained by this method from solid cachaza containing bagacillo from the rotary vacuum filter is substantially less. Contrary to their teachings, I have found that a more efficient separation of the wax is obtained by a fluid-fluid method wherein the water content of the solid cachaza containing bagacillo is adjusted to more than 85%, and sufficient to change the cachaza from a solid to a fluid state. I have further found that when bagacillo has been added to the cachaza for a filter aid, no appreciable emulsification takes place even though the water content of the cachaza is adjusted to more than 85%.

Now, therefore, in accordance with my invention, I have discovered a fluid-fluid method for recovering wax from solid cachaza containing a filter aid which comprises adjusting the water content of solid cachaza to more than 85%, the adjustment being in sufficient amount to change the cachaza from a solid to a fluid state, treating the fluid cachaza with a water-immiscible organic solvent for said wax, and separating wax-laden solvent and treated cachaza, and recovering wax from the separated solvent.

Now, having indicated in a general way, the nature and purpose of this invention, the following examples will illustrate the invention. It is to be understood, however, that such examples are presented merely as illustrations of the invention and are not to be construed as limiting the same. In the examples, the ingredients are given in parts by weight, unless otherwise indicated.

TABLE IV

*Illustration of difference in moisture content of plate-and-frame cachaza and rotary vacuum filter cake containing varying amounts of bagacillo*

Allen in The Planter, 71, 250 (1923) gives the following moisture content of plate-and-frame single and double pressing covering six years of each class of work in a Puerto Rican factory.

TABLE I

| | Per Cent Sugar | Per Cent Moisture |
|---|---|---|
| Single Pressing | 3.925 | 55.15 |
| Double Pressing | 1.233 | 59.03 |

A series of tests were run to determine the efficiency of the extraction of sugar and the moisture content of the cachaza using an Oliver continuous rotary vacuum filter on cachaza containing from 350 pounds to 550 pounds of bagacillo, at 10 pounds per cubic foot, per 1500 gallons of filter feed at high, medium and low drum speeds. The results are tabulated in the following table:

TABLE II

| Pounds of Bagacillo Per 1500 Gal. Filter Feed | Sucrose in Cake | Moisture in Cake | Thickness of Cake | Time Consm., | High Vacuum | Low Vacuum | Wt. Sq. Ft. of Cake |
|---|---|---|---|---|---|---|---|
| Low Speed—5 min./rev.—Water Spray 22 gals. per minute | | | | | | | |
| | Per Cent | Per Cent | Inches | Minutes | | | |
| 350 | 0.4 | 81.39 | 1/4 | 39 | 19.5 | 8.0 | 1.06 |
| 450 | 1.0 | 81.79 | 5/16 | 36 | 18.5 | 8.0 | ---- |
| 550 | 1.6 | 80.30 | 7/16 | 26 | 19.5 | 8.0 | 1.50 |
| Medium Speed—3′ 10″/rev.—Water Spray 22 gals. per minute | | | | | | | |
| 350 | 2.2 | 79.86 | 3/16 | 34 | 19.0 | 8.0 | .75 |
| 450 | 1.05 | 81.65 | 5/16 | 28 | 19.0 | 8.0 | 1.5 |
| 550 | 2.0 | 81.02 | 7/16 | 22 | 19.0 | 8.0 | 1.5 |
| High Speed—2′ 32″/rev.—Water Spray 22 gals. per minute | | | | | | | |
| 350 | 2.35 | 80.06 | 5/16 | 23 | 17.0 | 7.5 | 1.31 |
| 450 | 2.37 | 80.25 | 1/4 | 21 | 15.0 | 7.0 | 1.44 |

EXAMPLE 2

*Illustration of bagacillo as a filter aid*

Three samples were prepared from a quantity of filter feed containing 0%, 4% and 6% of bagacillo respectively and filtered. The results are shown in Table III.

TABLE III

| Amount of Hot Filter Feed | Wt. of Cake | Moisture Cake | Bagacillo |
|---|---|---|---|
| Grams | Grams | Percent | Percent |
| 1200 | 155 | 71.1 | 0 |
| 600 | 138 | 75.2 | 4 |
| 600 | 200 | 75.8 | 6 |

EXAMPLE 3

*Improved results when more than 85% water in cachaza containing bagacillo and cachaza being in fluid state*

Twenty-nine samples of solid cachaza obtained from an Oliver rotary vacuum filter, and having an average water content of about 80% were taken at intervals of twenty-four hours each. From 4% to 6% bagacillo had been added to the filter feed as a filter aid before filtering in each run. The samples of solid cachaza from the rotary vacuum filter were admixed with varying amounts of water. In 23 samples the water content of the solid cachaza was adjusted to from 80.9% to 85%, while in six samples the water content was adjusted to more than 85% and sufficient to change the cachaza from a solid to a fluid state. During the admixture, the mass was heated to about 130° F. and upon completion was treated at a temperature of about 165° F. in a continuous countercurrent manner in a horizontal extractor with commercial heptane, which distilled completely below 230° F. The amount of heptane used was about 5 pounds per pound of dry material. The concentrated extract or wax-laden solvent was removed continuously after contacting fresh cachaza, and the treated cachaza was continuously removed after contacting fresh heptane. The wax-laden heptane was then subjected to evaporation to remove the heptane, and the treated or extracted cachaza was admixed with sufficient water to form a slurry and the remaining heptane was removed by distillation. The improved results obtained when the water content of the cachaza containing bagacillo was more than 85% and sufficient to change the solid cachaza to the fluid state is shown in Table IV.

TABLE IV

| Run No. | Water Content of Cachaza After Adjustment | Average Per Cent of Extractables |
|---|---|---|
| 1-23 | From 80.9 to 85% | 47.9 |
| 24-29 | More than 85% to 87% | 52.5 |

While in the examples, heptane has been used as the solvent for the wax, the invention is not so limited. Various solvents, as hydrocarbons, more particularly aliphatic hydrocarbons, and especially a liquid petroleum fraction distilling completely at a temperature of about 230° F. may be used. In addition, other solvents may be used such as benzene, toluene, xylenes, hexanes, heptanes, octanes, nonanes, singly or in compatible admixtures, saturated cyclic hydrocarbons, as cyclohexane, and chlorinated hydrocarbons, as for example, butyl chloride and amyl chloride. Other solvents may be used such as lower alkyl acetates and propionates having from 1 to 5 carbon atoms, such as methyl, ethyl, propyl, butyl and amyl derivatives. Preferably, efficient results are obtained by the selection of a solvent which has a relatively high solvent power for wax and a limited solubility in water.

The temperature at which the extraction may be carried out is upwards of about 100° F. and that temperature which is the boiling point of the mixture of solvent and cachaza of proper water content at the pressure under which the cachaza is extracted may be considered as the maximum. Desirably, the temperature should not exceed the boiling point of the fluid cachaza and solvent at atmospheric pressure, and suitably not lower than 70° below such boiling point. Should a temperature above the boiling point at atmospheric pressure be employed, it would then be necessary to operate at a pressure higher than atmospheric.

The ratio of solvent to dry material may be from 0.5 pound to 20 pounds, and is preferably from 2 to 8 pounds of solvent per pound of dry material employed.

In carrying out my invention, it is essential that the water content of the solid cachaza containing bagacillo be adjusted to more than 85%, the upper limit depending upon the amount of water necessary to change the cachaza from a solid to a fluid state. The degree of fluidity desired will vary with the particular types of extractors used. For example a more fluid cachaza is generally desired in a vertical type countercurrent extractor, than in a horizontal type extractor. Generally, however, the preferred water content of the cachaza containing a filter aid will be within the range of more than 85% to 93%.

While bagacillo has been shown in Examples 2 and 3 as the filter aid, since it is readily available at the sugar mills and is a waste product, other filter aids such as corn hulls, kieselguhr and the like may be used, if preferred. Ordinarily from 2% to 10% by weight of the filter aid is added to the filter feed prior to filtration. There has been illustrated in Table II the results achieved by the addition of from 350 pounds to 550 pounds of bagacillo to 1500 gallons of filter feed, and then filtering at high, medium and low speeds. Ordinarily, the amount of filter aid added will be dictated by the conditions of operation necessary to achieve efficient operation of the filter.

While in Example 3 a method has been shown for removal of the solvent from the wax-laden solvent, and recovery of the solvent from the extracted cachaza, it will be understood that other methods known to those skilled in the art may be used.

In accordance with this invention a method has been described whereby wax may be efficiently extracted from solid cachaza containing a filter aid, such as bagacillo.

Other modes of applying the principle of the invention may be employed instead of those explained, change being made as regards the method herein disclosed, provided the step or steps stated by any of the following claims or the equivalent of such stated step or steps be employed.

I claim:

1. A fluid-fluid method for recovering wax from solid cachaza containing from 2% to 10% of a filter aid which comprises adjusting the water content of said solid cachaza to more than 85%, said adjustment being in sufficient amount to change said cachaza from a solid to a fluid state, treating said fluid cachaza with a water-immiscible organic solvent for said wax, and separating wax-laden solvent and treated cachaza, and recovering wax from said separated solvent.

2. A fluid-fluid method for recovering wax from solid cachaza containing from 2% to 10% of bagacillo which comprises adjusting the water content of said solid cachaza to more than 85%, said adjustment being in sufficient amount to change said cachaza from a solid to a fluid state, treating said fluid cachaza with a water-immiscible organic solvent for said wax, and separating wax-laden solvent and treated cachaza, and recovering wax from said separated solvent.

3. A fluid-fluid method for recovering wax from solid cachaza containing from 2% to 10% of a filter aid which comprises adjusting the water content of said solid cachaza to more than 85%, said adjustment being in sufficient amount to change said cachaza from a solid to a fluid state, treating said fluid cachaza with a liquid petroleum fraction which is a solvent for said wax, and separating wax-laden solvent and treated cachaza, and recovering wax from said separated solvent.

4. A fluid-fluid method for recovering wax from solid cachaza containing from 2% to 10% of a filter aid which comprises adjusting the water content of said solid cachaza to more than 85%, said adjustment being in sufficient amount to change said cachaza from a solid to a fluid state, treating said fluid cachaza with heptane, and separating wax-laden heptane and treated cachaza and recovering wax from said separated heptane.

5. A fluid-fluid method for recovering wax from solid cachaza containing from 2% to 10% of bagacillo which comprises adjusting the water content of said solid cachaza to more than 85%, said adjustment being in sufficient amount to change said cachaza from a solid to a fluid state, treating said fluid cachaza with heptane, and separating wax-laden heptane and treated cachaza, and recovering wax from said separated heptane.

6. A fluid-fluid method for recovering wax from solid cachaza containing from 2% to 10% of a filter aid which comprises adjusting the water content of said solid cachaza to more than 85%, but not more than 93%, said adjustment being in sufficient amount to change said cachaza from a solid to a fluid state, treating said fluid cachaza with a water-immiscible organic solvent for said wax, and separating wax-laden solvent and treated cachaza, and recovering wax from said separated solvent.

7. A fluid-fluid method for recovering wax from solid cachaza containing from 2% to 10% of bagacillo which comprises adjusting the water content of said solid cachaza to more than 85%, but not more than 93%, said adjustment being in sufficient amount to change said cachaza from a solid to a fluid state, treating said fluid cachaza with a water-immiscible organic solvent for said wax, and separating wax-laden solvent and treated cachaza, and recovering wax from said separated solvent.

8. A fluid-fluid method for recovering wax from solid cachaza containing from 2% to 10% of bagacillo which comprises adjusting the water content of said solid cachaza to more than 85%, but not more than 93%, said adjustment being in sufficient amount to change said cachaza from a solid to a fluid state, treating said fluid cachaza with heptane, and separating wax-laden heptane and treated cachaza, and recovering wax from said separated heptane.

OSCAR J. SWENSON.

REFERENCES CITED

The following references are of record in the file of this patent:

UNITED STATES PATENTS

| Number | Name | Date |
| --- | --- | --- |
| 2,428,813 | Rhodes et al. | Oct. 14, 1947 |

OTHER REFERENCES

Chemical Abstracts, vol. 33 (1939), page 6081, citing Jenkins & Wohryzek.